US008483763B2

(12) United States Patent
Huang et al.

(10) Patent No.: US 8,483,763 B2

(45) Date of Patent: Jul. 9, 2013

(54) FEEDING APPARATUS FOR MONOPOLE ANTENNA AND RELATED ANALOG BROADCAST PLAYER SYSTEM AND INTEGRATION SYSTEM

(75) Inventors: Chang-Hsiu Huang, Taipei Hsien (TW); Chieh-Sheng Hsu, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 662 days.

(21) Appl. No.: 12/684,973

(22) Filed: Jan. 11, 2010

(65) Prior Publication Data

US 2010/0184368 A1 Jul. 22, 2010

(30) Foreign Application Priority Data

Jan. 22, 2009 (TW) ................................ 98102496 A

(51) Int. Cl.
*H04M 1/00* (2006.01)

(52) U.S. Cl.
USPC .................. 455/562.1; 455/569.2; 455/575.9; 455/152.1; 343/795

(58) Field of Classification Search
USPC ............. 455/562.1, 569.2, 575.9, 152.1, 344, 455/345, 3.06, 3.02; 439/581; 343/795, 749
See application file for complete search history.

(56) References Cited

U.S. PATENT DOCUMENTS 3,763,482 A * 10/1973 Burney et al. ................. 340/564
3,833,897 A * 9/1974 Bell et al. ...................... 367/136
4,241,973 A * 12/1980 Mayer et al. .................. 439/581
4,259,673 A * 3/1981 Guretzky ...................... 343/825
4,447,107 A * 5/1984 Major et al. .................. 439/584
4,630,061 A * 12/1986 Hately .......................... 343/749
4,661,992 A * 4/1987 Garay et al. ................. 455/90.3
5,489,912 A * 2/1996 Holloway ...................... 343/749
5,734,350 A * 3/1998 Deming et al. ........ 343/700 MS
6,175,332 B1 * 1/2001 Fedors .................. 343/700 MS
6,307,524 B1 * 10/2001 Britain .......................... 343/795
6,320,558 B1 * 11/2001 Walton .......................... 343/906
6,483,468 B2 * 11/2002 Walton .......................... 343/713
6,774,858 B1 * 8/2004 Wiesenfarth .................. 343/739
7,373,169 B2 5/2008 Yoshino
7,554,506 B2 6/2009 Chung
7,777,682 B2 * 8/2010 Yagi ............................. 343/725
2002/0027532 A1 * 3/2002 Walton .......................... 343/906
2005/0239434 A1 10/2005 Marlowe
2011/0273360 A1 * 11/2011 Campero et al. .............. 343/893
2012/0061257 A1 * 3/2012 Yu et al. ........................ 205/792

FOREIGN PATENT DOCUMENTS

CN 201041827 Y 3/2008
CN 101188431 A 5/2008
CN 101202378 A 6/2008
TW 200631837 9/2006
TW I267229 11/2006

* cited by examiner

*Primary Examiner* — Minh D Dao
(74) *Attorney, Agent, or Firm* — Winston Hsu; Scott Margo

(57) ABSTRACT

A feeding apparatus for a monopole antenna having a radiating unit and a grounding unit is for transmitting a multimedia signal to a multimedia player device coupled to the radiating unit. The feeding apparatus includes a first feeding unit coupled to an inner conductor of a coaxial cable for feeding the multimedia signal transmitted by the coaxial cable to the radiating unit, and a second feeding unit coupled to a conducting mesh of the coaxial cable for connecting to the grounding unit.

11 Claims, 11 Drawing Sheets

| 88MHz | | | | | | |
|---|---|---|---|---|---|---|
| | S11 (dB) | S12 (dB) | $\lvert S11\rvert^2$ | $\lvert S12\rvert^2$ | Energy radiated to space | ($\lvert S12\rvert^2$)/(Energy radiated to space) (dB) |
| FIG.4 | -12.51 | -1.33 | 0.056 | 0.736 | 0.208 | 5.496 |
| FIG.5 | -12.93 | -1.54 | 0.051 | 0.701 | 0.248 | 4.522 |
| FIG.6 | -11.05 | -1.59 | 0.079 | 0.693 | 0.228 | 4.830 |
| FIG.7 | -12.20 | -1.62 | 0.060 | 0.689 | 0.251 | 4.382 |
| FIG.8 | -9.98 | -1.57 | 0.100 | 0.697 | 0.203 | 5.357 |
| FIG.9 | -12.05 | -1.37 | 0.062 | 0.729 | 0.208 | 5.446 |
| FIG.10 | -10.48 | -1.63 | 0.090 | 0.687 | 0.223 | 4.879 |

| 98MHz | | | | | | |
|---|---|---|---|---|---|---|
| | S11 (dB) | S12 (dB) | \|S11\|^2 | \|S12\|^2 | Energy radiated to space | ($\lvert S12\rvert^2$)/(Energy radiated to space) (dB) |
| FIG.4 | -11.91 | -2.31 | 0.064 | 0.587 | 0.348 | 2.273 |
| FIG.5 | -12.60 | -2.69 | 0.055 | 0.538 | 0.407 | 1.216 |
| FIG.6 | -13.35 | -2.29 | 0.046 | 0.590 | 0.364 | 2.104 |
| FIG.7 | -12.43 | -2.48 | 0.057 | 0.565 | 0.378 | 1.746 |
| FIG.8 | -10.31 | -2.52 | 0.093 | 0.560 | 0.347 | 2.075 |
| FIG.9 | -11.51 | -2.28 | 0.071 | 0.592 | 0.338 | 2.433 |
| FIG.10 | -11.09 | -2.50 | 0.078 | 0.562 | 0.360 | 1.939 |

| 108MHz | | | | | | |
|---|---|---|---|---|---|---|
| | S11 (dB) | S12 (dB) | \|S11\|^2 | \|S12\|^2 | Energy radiated to space | ($\lvert S12\rvert^2$)/(Energy radiated to space) (dB) |
| FIG.4 | -17.01 | -1.55 | 0.020 | 0.700 | 0.280 | 3.975 |
| FIG.5 | -9.88 | -2.38 | 0.103 | 0.578 | 0.319 | 2.581 |
| FIG.6 | -10.04 | -2.48 | 0.099 | 0.565 | 0.336 | 2.257 |
| FIG.7 | -10.84 | -1.90 | 0.082 | 0.646 | 0.272 | 3.755 |
| FIG.8 | -14.38 | -1.62 | 0.036 | 0.689 | 0.275 | 3.989 |
| FIG.9 | -14.43 | -1.62 | 0.036 | 0.689 | 0.275 | 3.982 |
| FIG.10 | -16.97 | -1.43 | 0.020 | 0.719 | 0.260 | 4.413 |

FIG. 11

FEEDING APPARATUS FOR MONOPOLE ANTENNA AND RELATED ANALOG BROADCAST PLAYER SYSTEM AND INTEGRATION SYSTEM

BACKGROUND OF THE INVENTION

1. Field of the Invention

The present invention provides a feeding apparatus for monopole antennae and related analog broadcast player system and integration system, and particularly a feeding apparatus using a conduction method for transmitting signals to a monopole antenna and related analog broadcast player system and integration system 2. Description of the Prior Art Digital broadcast satellite (DBS) is a broadcasting technique following AM and FM broadcasting. The DBS technology has better spectral utilization efficiency, and can solve the lack of available broadcasting channels. Moreover, the DBS technology also can provide CD-like quality and additional data services fitting the diversification of broadcasting media. On the other hand, the DBS has advantages of wide coverage areas, so that wherever you are (even on the ocean or in the desert), the signal of the DBS may be received. Therefore, the analog broadcasting system is tending to be replaced by the digital broadcast satellite system.

However, in general, vehicle manufacturers do not adopt the DBS receiver as a standard equipment of the head unit in order to lower costs. Thus, a user needs to buy an additional digital broadcasting demodulator for receiving digital broadcasting programs. The prior art outputs satellite broadcast programs received by the DBS receiver through the head unit of the vehicle. For example, please refer to FIG. 1. FIG. 1 is a schematic diagram of interaction between a vehicle satellite audio receiver 110 and a vehicle frequency modulation (FM) head unit 120 in the prior art. The vehicle satellite audio receiver 110 includes a satellite antenna 112, a satellite broadcast transformation device 114, and a monopole antenna 116. The vehicle FM head unit 120 includes a FM antenna 122, an FM radio receiver 124, and a speaker 126. The satellite antenna 112 is utilized for receiving a digital satellite broadcast signal S. The satellite broadcast transformation device 114 is utilized for demodulating the received digital satellite broadcast signal S into an FM signal $S_{S\_FM}$, and transmitting the FM signal $S_{S\_FM}$ to the vehicle FM head unit 120 by radiating. The FM radio receiver 124 can demodulate the FM signal $S_{S\_FM}$ into an audio signal $S_{audio}$ after the FM signal $S_{S\_FM}$ is received by the FM antenna 122. Thus, the user can output the contents of broadcast programs received by the vehicle satellite audio receiver 110 via the vehicle FM head unit 120. Nevertheless, due to the long distance between the monopole antenna 116 of the vehicle satellite audio receiver 110 and the FM antenna 122, the FM antenna 122 may receive only a slight signal after spatial propagation. In addition, because the monopole antenna 116 transmits signal energy to the FM antenna 122 by radiating, compliance to the electromagnetic compatibility and electromagnetic interference (EMC/EMI) standards of the Federal Communications Commission (FCC) should be considered. In such a condition, radiation energy cannot increase indefinitely while transmitting signals. Therefore, the transmission efficiency will become unstable above limitations.

Besides using the radiating method, the FM signal $S_{S\_FM}$ can also be transmitted through directly connection with the vehicle FM head unit 120. However, the vehicle FM head unit 120 is integrated with a vehicle housing or interior, so the user must take the vehicle housing or interior apart and change the original wiring arrangement for connecting other signal wires, causing inconvenience for the user. In such a situation, the prior art provides another improved method that does not require taking the vehicle housing or interior apart. As shown in FIG. 2, a coaxial cable 202 having a grip 204 is substituted for the monopole antenna 116. The FM signal $S_{S\_FM}$ is transmitted from the vehicle satellite audio receiver 110 to the vehicle FM head unit 120. The FM antenna 122 and the conducting mesh of the coaxial cable 202 are utilized for grounding. However, the exterior of the FM antenna 122 usually has an insulator, such that the conducting mesh of the coaxial cable 202 can not electrically connect to the grounding portion of the FM antenna 122, which reduces feeding characteristics.

In short, in the prior art, environmental limitations may easily cause unstable transmission when using radiation to transmit multimedia signals of other multimedia devices into a vehicle head unit. However, the user needs to take the vehicle housing or interior apart and change the original wiring arrangement to connect other types of signal wires. Therefore, development of a convenient device with good transmission efficiency becomes an important topic in this field.

SUMMARY OF THE INVENTION

It is therefore a primary objective of the claimed invention to provide a feeding apparatus for monopole antenna and related analog broadcast player system and integration system.

An embodiment of the invention discloses a feeding apparatus for a monopole antenna having a radiating unit and a grounding unit, for transmitting a multimedia signal to a multimedia player device coupled to the radiating unit, the feeding apparatus comprising a first feeding unit coupled to an inner conductor of a coaxial cable for feeding the multimedia signal transmitted by the coaxial cable to the radiating unit; and a second feeding unit coupled to a conducting mesh of the coaxial cable for connecting to the grounding unit.

An embodiment of the invention further discloses an analog broadcast player system, comprising a monopole antenna having a radiating unit and a grounding unit; a feeding apparatus, comprising a first feeding unit coupled to an inner conductor of a coaxial cable for feeding a multimedia signal transmitted by the coaxial cable to the radiating unit; and a second feeding unit coupled to a conducting mesh of the coaxial cable for connecting to the grounding unit; and a multimedia player device coupled to the radiating unit for demodulating and playing the multimedia signal.

An embodiment of the invention further discloses a digital and analog broadcast integration system, comprising a digital broadcast transformation device for receiving a digital satellite broadcast signal, and transforming the digital satellite broadcast signal into an analog broadcast signal in order to transmit the analog broadcast signal to a analog broadcast player system via a coaxial cable; an analog broadcast player system, comprising a monopole antenna having a radiating unit and a grounding unit; a feeding apparatus, comprising a first feeding unit coupled to an inner conductor of the coaxial cable for feeding the analog broadcast signal to the radiating unit; and a second feeding unit coupled to a conducting mesh of the coaxial cable for connecting to the grounding unit; and a multimedia player device coupled to the radiating unit for demodulating and playing the analog broadcast signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4(*b*) is a schematic diagram of an equivalent transmission line when using a conduction method shown in FIG. 4(*a*) according to an embodiment of the invention.

FIG. 5(*b*) is a schematic diagram of an equivalent transmission line when using a conduction method shown in FIG. 5(*a*) according to an embodiment of the invention.

FIG. 6(*b*) is a schematic diagram of an equivalent transmission line when using a conduction method shown in FIG. 6(*a*) according to an embodiment of the invention.

FIG. 7(*b*) is a schematic diagram of an equivalent transmission line when using a conduction method shown in FIG. 7(*a*) according to an embodiment of the invention.

FIG. 8(*b*) is a schematic diagram of an equivalent transmission line when using a conduction method shown in FIG. 7(*a*) according to an embodiment of the invention.

FIG. 9(*b*) is a schematic diagram of an equivalent transmission line when using a conduction method shown in FIG. 9(*a*) according to an embodiment of the invention.

FIG. 10(*b*) is a schematic diagram of an equivalent transmission line when using a conduction method shown in FIG. 10(*a*) according to an embodiment of the invention.

FIG. 11 is a measurement result of a feeding characteristic at various frequencies according to an embodiment of the invention.

DETAILED DESCRIPTION

Figure 1:
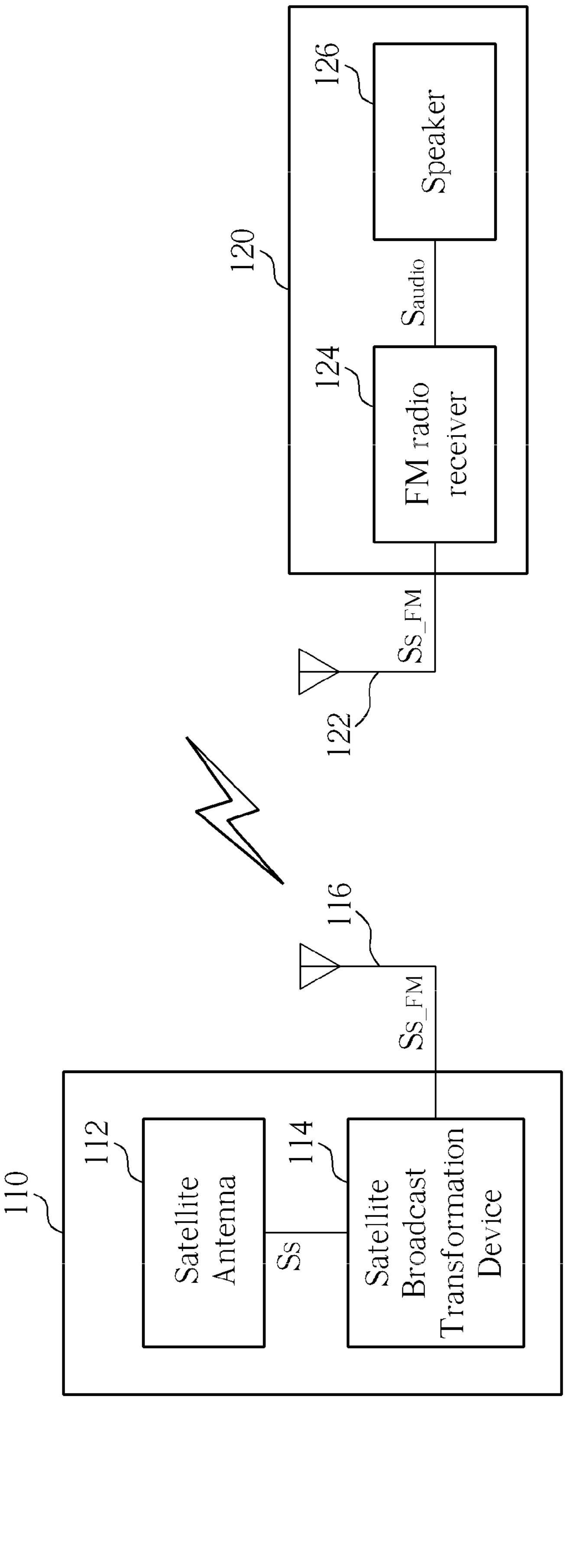
FIG. 1 PRIOR ART
FIG. 1 is a schematic diagram of interaction between a vehicle satellite audio receiver and a vehicle FM head unit in the prior.
Figure 2:
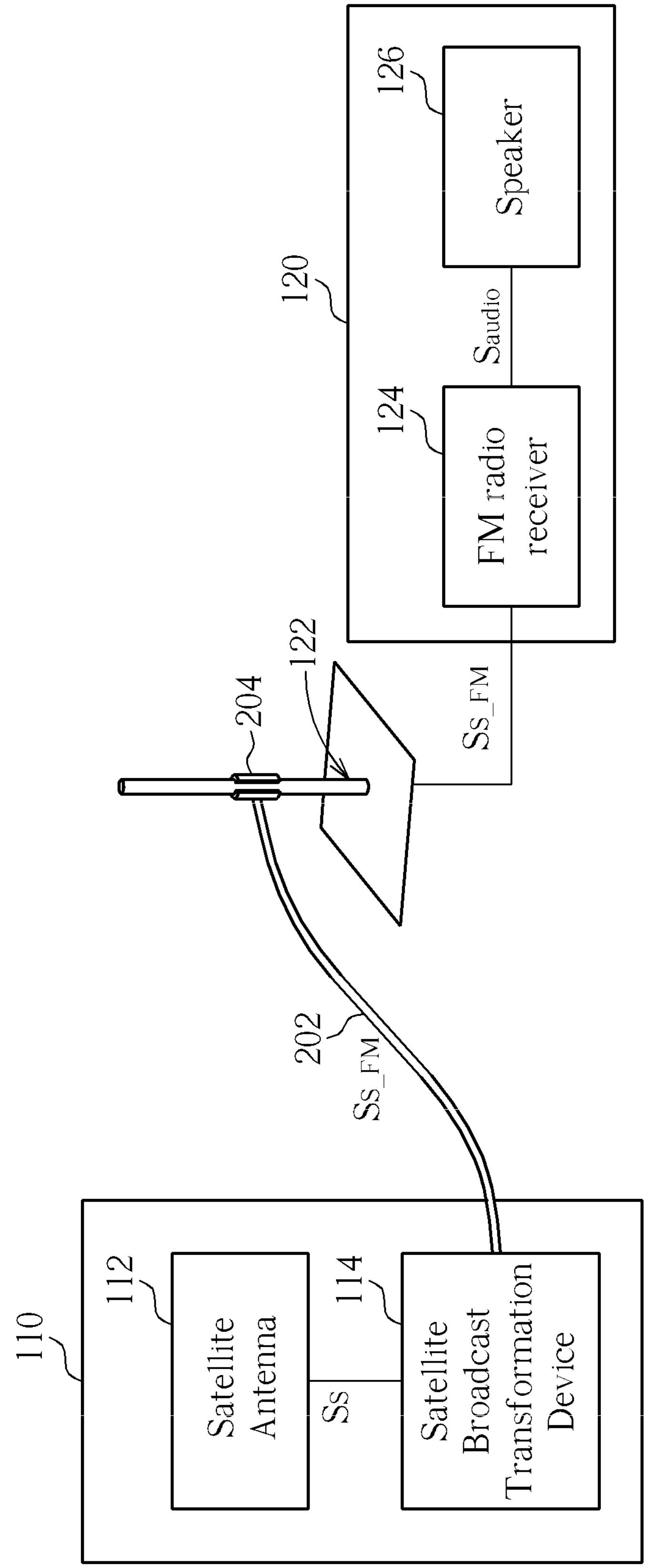
FIG. 2 PRIOR ART
FIG. 2 is another schematic diagram of interaction between a vehicle satellite audio receiver and a vehicle FM head unit in the prior.
Figure 3:
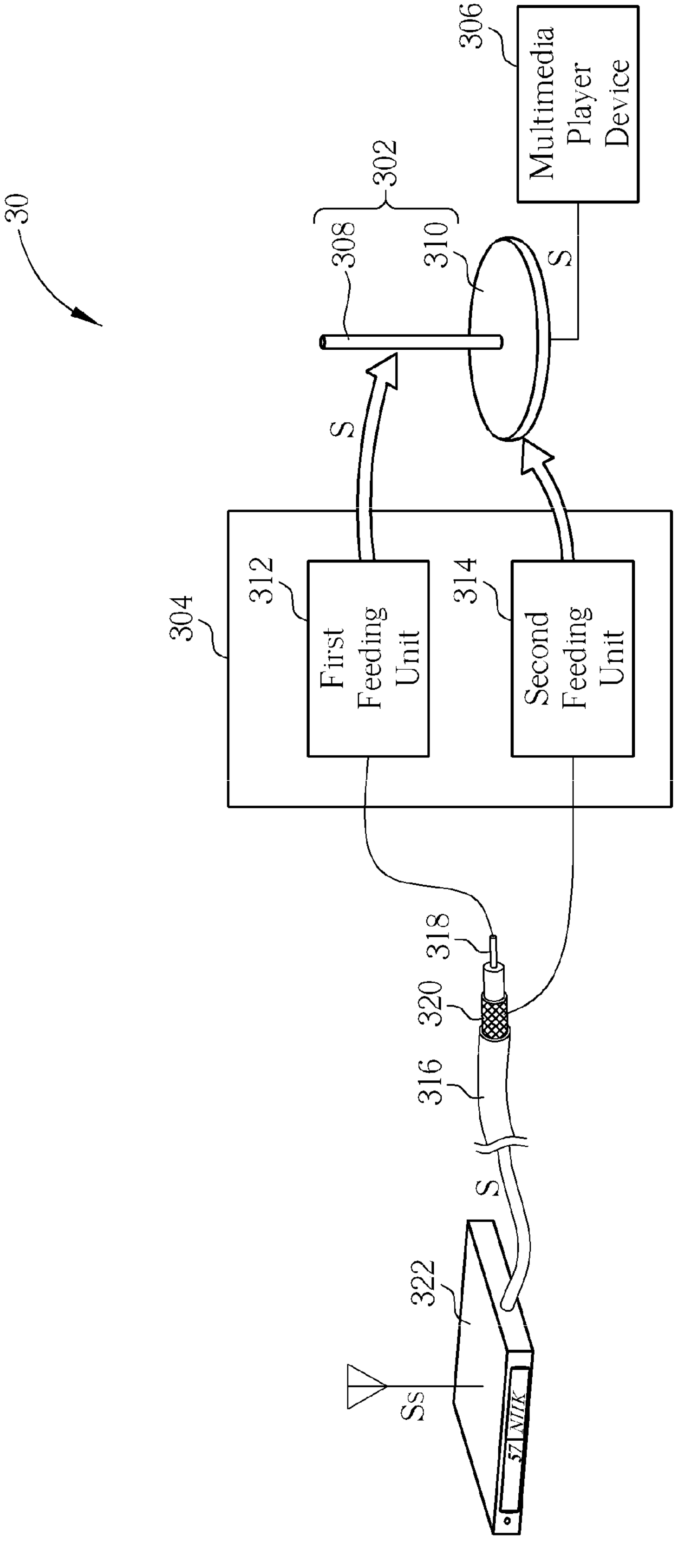
FIG. 3 is a schematic diagram of interaction of an analog broadcast player system and a digital satellite broadcast transformation device according to an embodiment of the invention.

Please refer to FIG. 3. FIG. 3 is a schematic diagram of interaction between an analog broadcast player system 30 and a digital satellite broadcast transformation device 322 according to an embodiment of the invention. The analog broadcast player system 30 is preferably a vehicle FM player device which can play the analog broadcast signal for the broadcast system, and is not limited. The digital satellite broadcast transformation device 322 is capable of demodulating the received digital satellite broadcast signal $S_S$, transforming the digital satellite broadcast signal $S_S$ into an analog broadcast signal S, and transmitting the analog broadcast signal S to the analog broadcast player system 30 via a coaxial cable 316. The analog broadcast player system 30 includes a monopole antenna 302, a feeding apparatus 304, and a multimedia player device 306. The monopole antenna 302 includes a radiating unit 308 and a grounding unit 310. Size and appearance of the monopole antenna 302 correspond to specific broadcast systems, such as an FM broadcast system, and are not limited. The feeding apparatus 304 includes a first feeding unit 312 and a second feeding unit 314. The first feeding unit 312 is coupled to an inner conductor 318 of a coaxial cable 316 for feeding the analog broadcast signal S to the radiating unit 308. The second feeding unit 314 is coupled to a conducting mesh 320 of coaxial cable 316 for connecting to the grounding unit 310. The multimedia player device 306 is coupled to the radiating unit 308 for demodulating and playing the analog broadcast signal S.

Therefore, through the invention, if a user wants to listen to a digital satellite broadcast program, the digital satellite broadcast transformation device 322 can receive the digital satellite broadcast signal $S_S$ and transform the digital satellite broadcast signal $S_S$ into the analog broadcast signal S. After that, the digital satellite broadcast transformation device 322 can feed the analog broadcast signal S to the analog broadcast player system 30 through the coaxial cable 316 and the feeding apparatus 304 completely, so as to utilize the analog broadcast player system 30 for playing the analog broadcast signal S. In such a condition, the conducting mesh 320 can be connected with the grounding unit 310 via the feeding apparatus 304, achieving a perfect grounding effect and high transmission efficiency. Furthermore, a user is capable of playing contents of the digital satellite broadcast program by sharing the analog broadcast player system 30 without taking a vehicle housing or interior apart and considering the limitations of the FCC regulations.

Figure 4A:
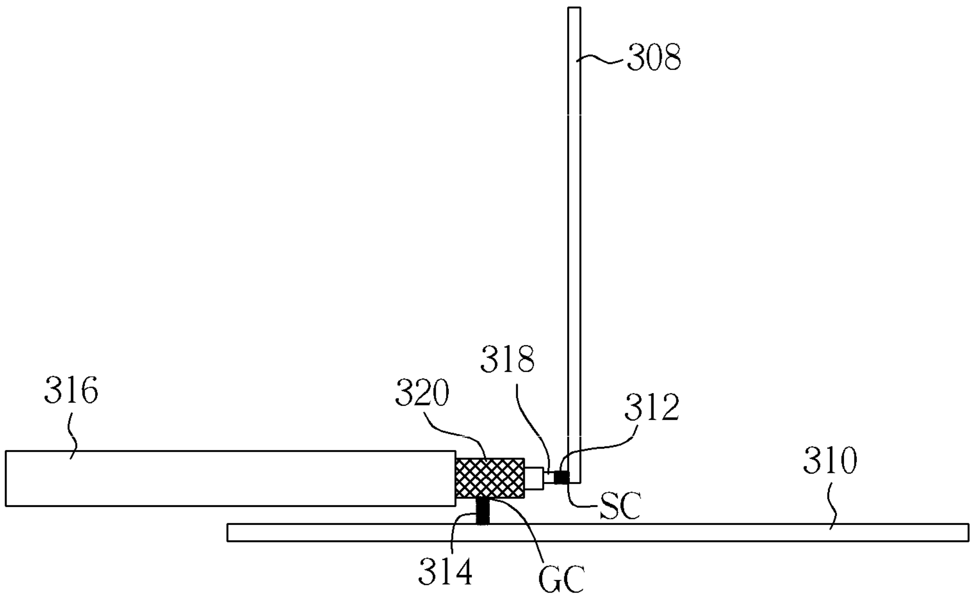
FIG. 4(*a*) is a schematic diagram of the feeding apparatus shown in FIG. 3 according to an embodiment of the invention.
Figure 4B:
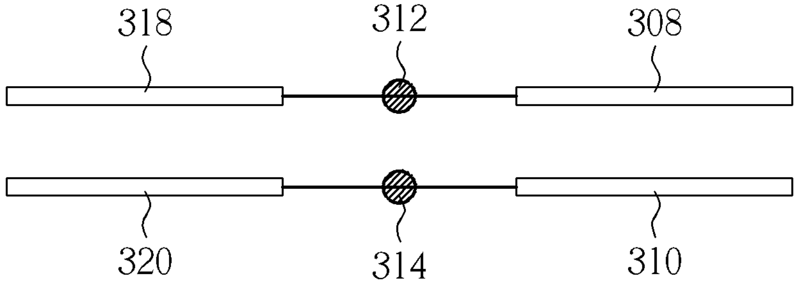

Furthermore, please refer to FIG. 4(*a*) and FIG. 4(*b*). FIG. 4(*a*) is a schematic diagram of the feeding apparatus 304 shown in FIG. 3 according to an embodiment of the invention. FIG. 4(*b*) is a schematic diagram of an equivalent transmission line when using the conduction method shown in FIG. 4(*a*) according to an embodiment of the invention. In FIG. 4(*a*), the feeding apparatus 304 feeds the signal through a metal connection. As shown in FIG. 4(*a*), the first feeding unit 312 makes direct contact with the radiating unit 308 through metal connection (metal contacting point SC shown in FIG. 4(*a*)) for feeding the analog broadcast signal S from the inner conductor 318 to the radiating unit 308. Similarly, the second feeding unit 314 directly contacts the grounding unit 310 through metal connection (metal contacting point GC shown in FIG. 4(*a*)). Preferably, the first feeding unit 312 and the radiating unit 308 are made of metal material, and the second feeding unit 314 and the grounding unit 310 are also made of metal material in order to realize metal connection for feeding signals.

Figure 5A:
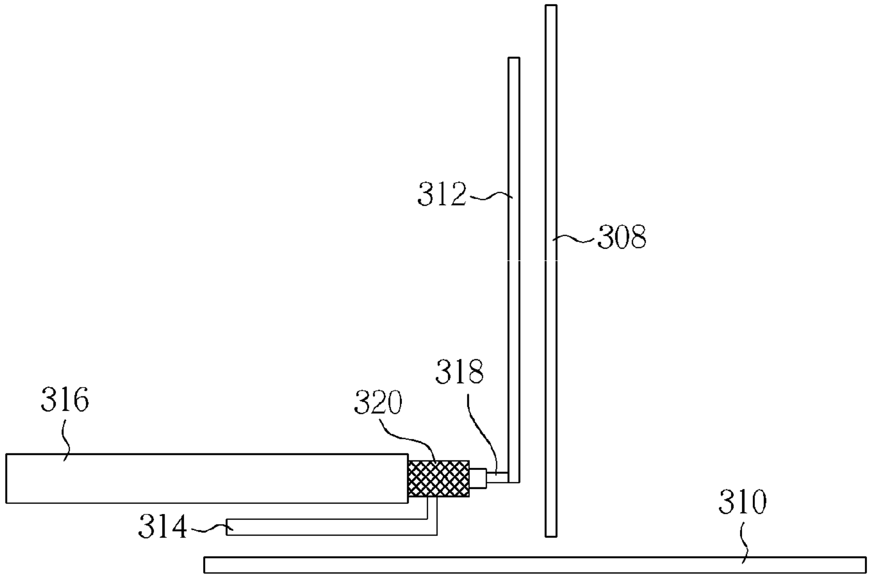
FIG. 5(*a*) is another schematic diagram of the feeding apparatus shown in FIG. 3 according to an embodiment of the invention.
Figure 5B:
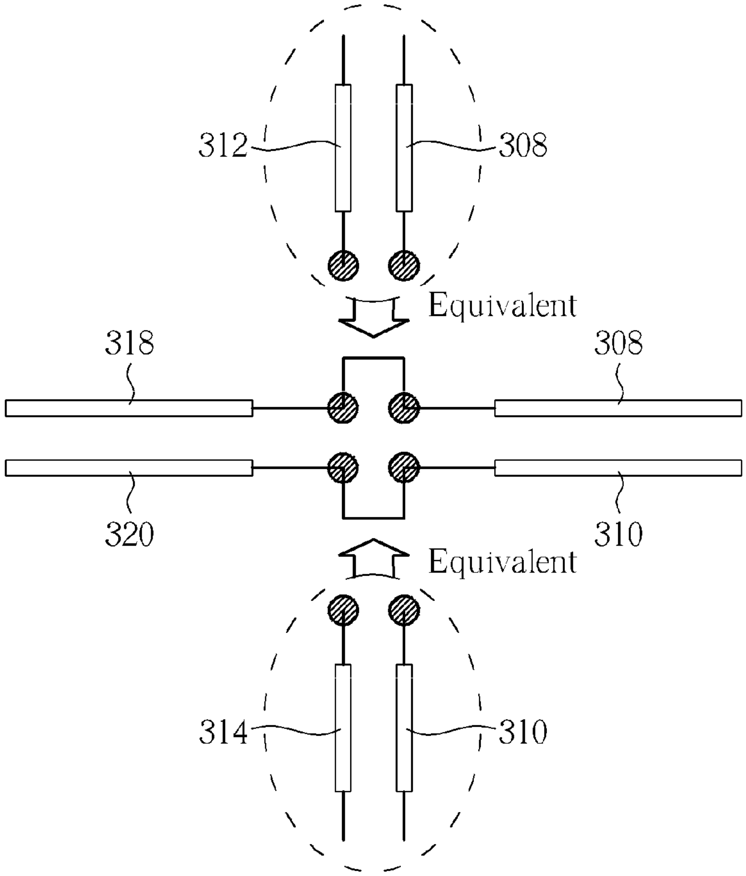
Figure 6A:
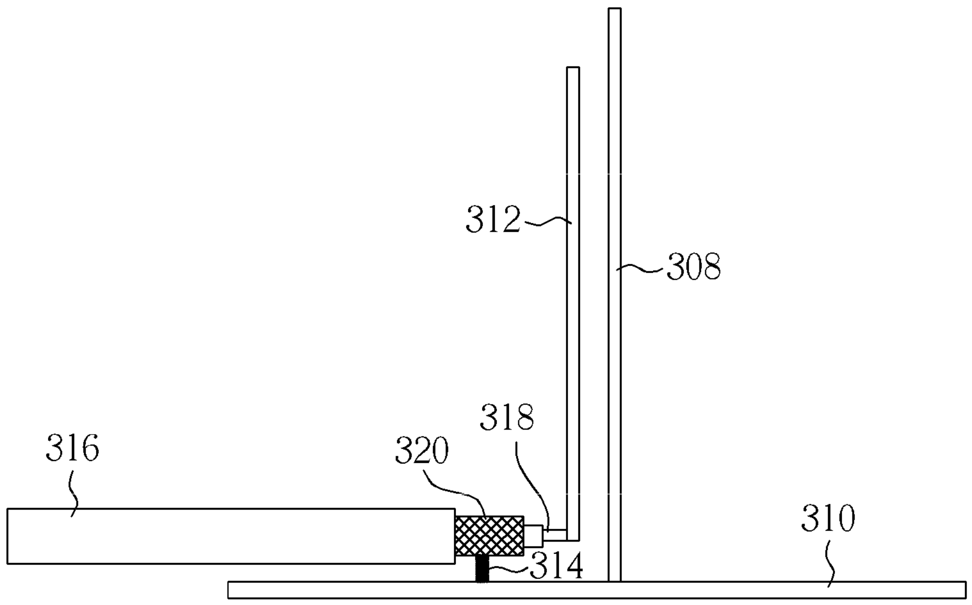
FIG. 6(*a*) is another schematic diagram of the feeding apparatus shown in FIG. 3 according to an embodiment of the invention.
Figure 6B:
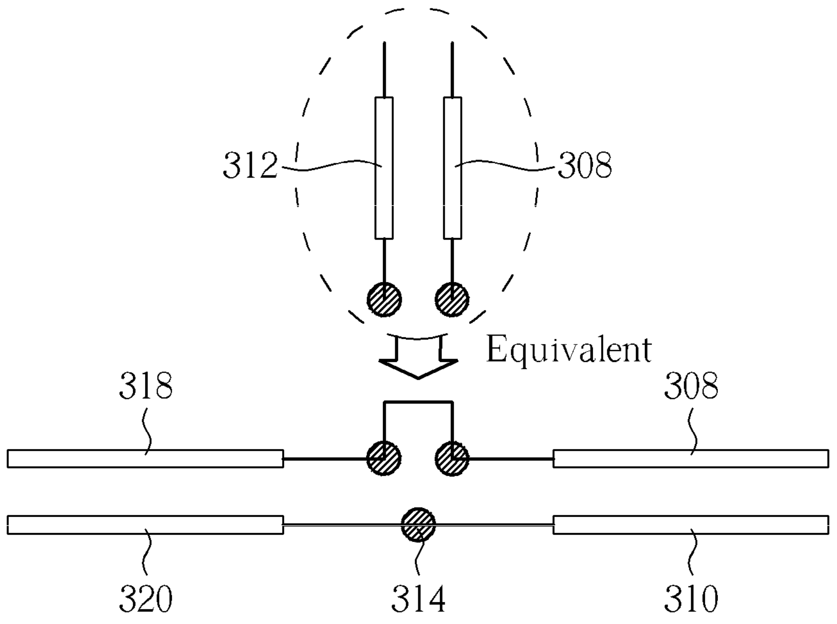
Figure 7A:
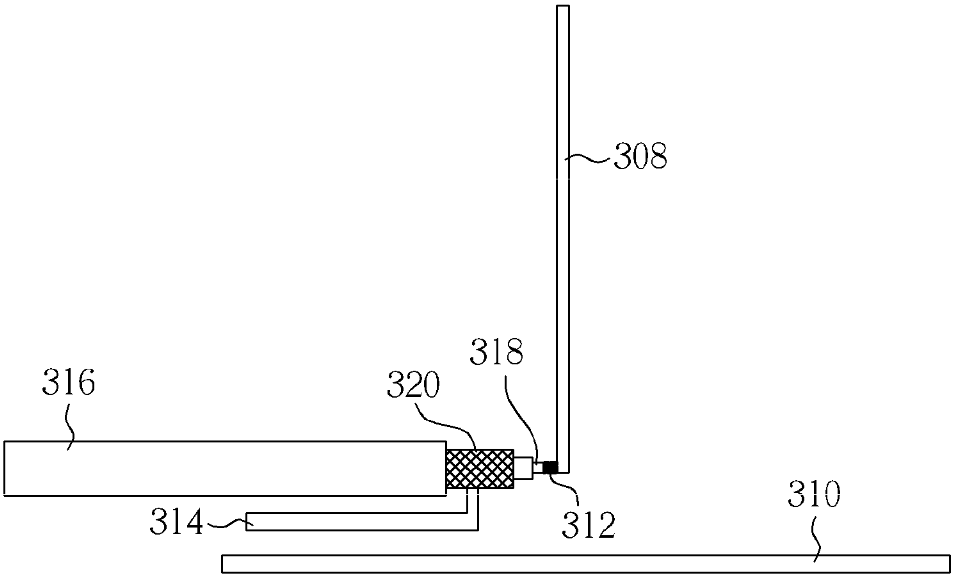
FIG. 7(*a*) is another schematic diagram of the feeding apparatus shown in FIG. 3 according to an embodiment of the invention.
Figure 7B:
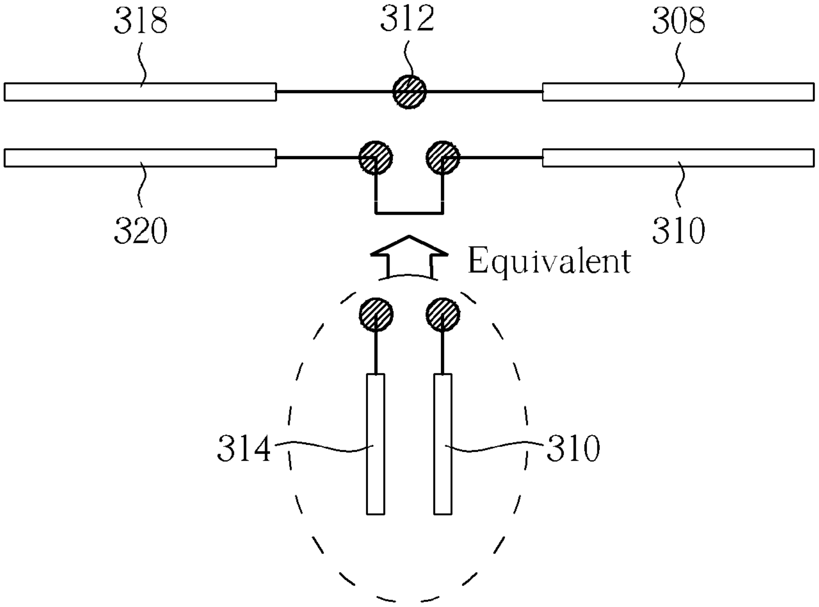

In some conditions, the above-mentioned metal connecting method can not be realized, for example when the exterior of the monopole antenna 302 is covered with insulator, or when paint coats the metal surface of a vehicle completely. For dealing with these conditions, a ¼ wavelength open circuit transmission line is utilized for feeding the signal. Please refer to the FIG. 5(*a*) and FIG. 5(*b*). FIG. 5(*a*) is another schematic diagram of the feeding apparatus 304 shown in FIG. 3 according to an embodiment of the invention. FIG. 5(*b*) is a schematic diagram of an equivalent transmission line when using the conduction method shown in FIG. 5(*a*) according to an embodiment of the invention. As shown in FIG. 5(*a*), the two ¼ wavelength open circuit transmission lines are equivalent to a short circuit effect through impedance transformation. The first feeding unit 312 and the radiating unit 308, the second feeding unit 314 and the grounding unit 310 are ¼ wavelength open circuit transmission lines. For example, the first feeding unit 312 can be implemented with an insulated metal line for realizing the ¼ wavelength open circuit transmission line. Suppose the radiating unit 308 is essentially a metal line. In such a condition, the first feeding unit 312 and the radiating unit 308 can be considered an equivalent short circuit, and the analog broadcast signal S may be transmitted to the monopole antenna 302. Similarly, the second feeding unit 314 can be implemented with an insulated metal line for realizing the ¼ wavelength open circuit transmission line. Suppose the grounding unit 310 is essentially a grounding metal. Please refer to FIG. 6(*a*) to FIG. 7(*b*). In FIG. 6(*a*), the signal transmission portion utilizes the metal connecting method shown in FIG. 4(*a*); the grounding portion utilizes the ¼ wavelength open circuit transmission line method shown in FIG. 5(*a*). In FIG. 7(*a*), the signal transmission portion utilizes the ¼ wavelength open circuit transmission line method shown in FIG. 5(*a*); the grounding portion utilizes the metal connecting method shown in FIG. 4(*a*).

Figure 8A:
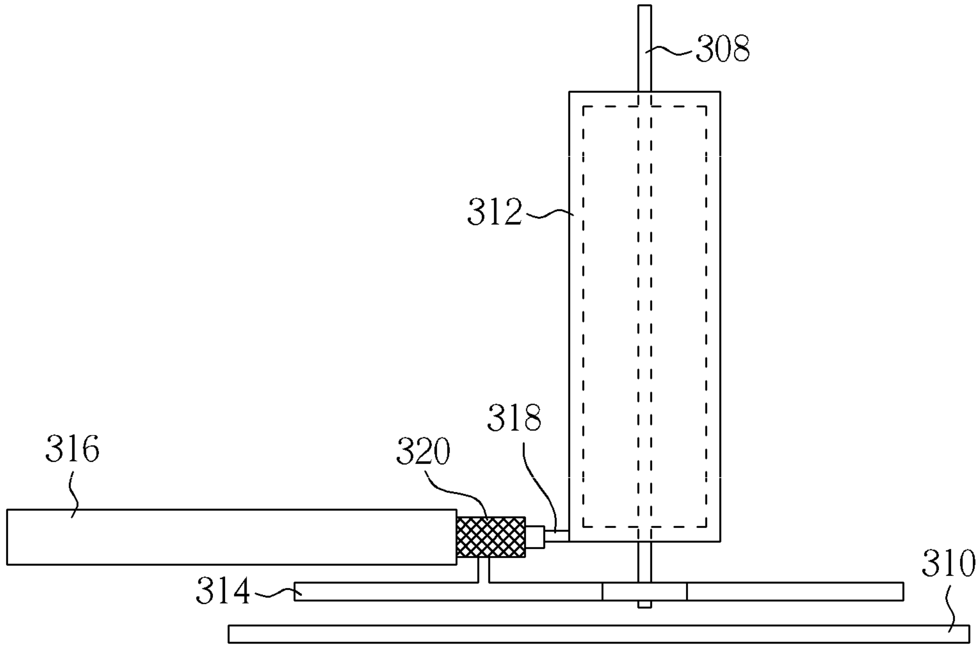
FIG. 8(*a*) is another schematic diagram of the feeding apparatus shown in FIG. 3 according to an embodiment of the invention.
Figure 8B:
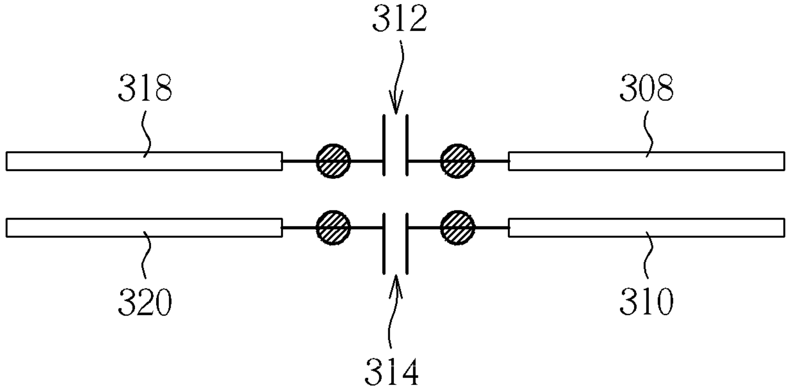
Figure 9A:
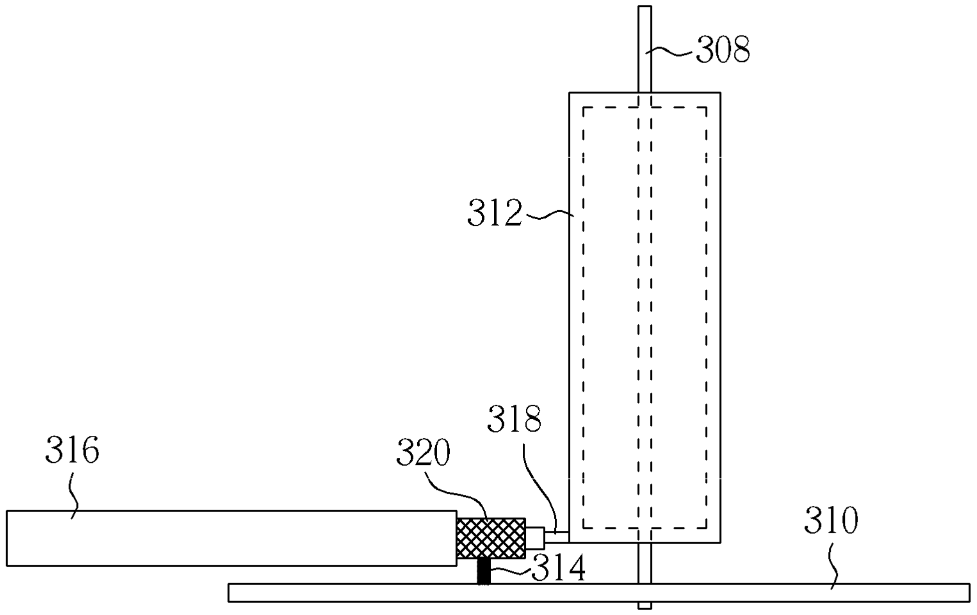
FIG. 9(*a*) is another schematic diagram of the feeding apparatus shown in FIG. 3 according to an embodiment of the invention.
Figure 9B:
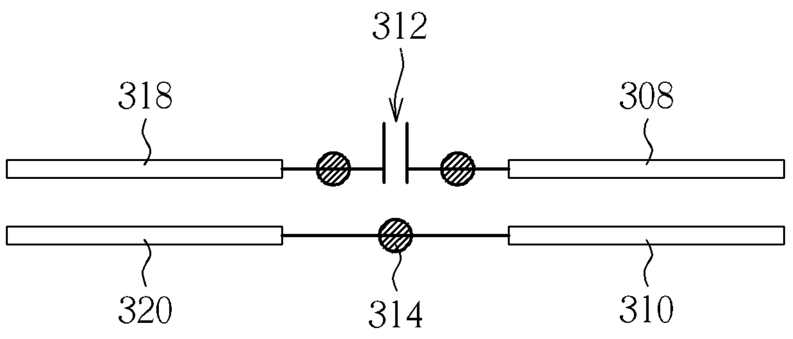
Figure 10A:
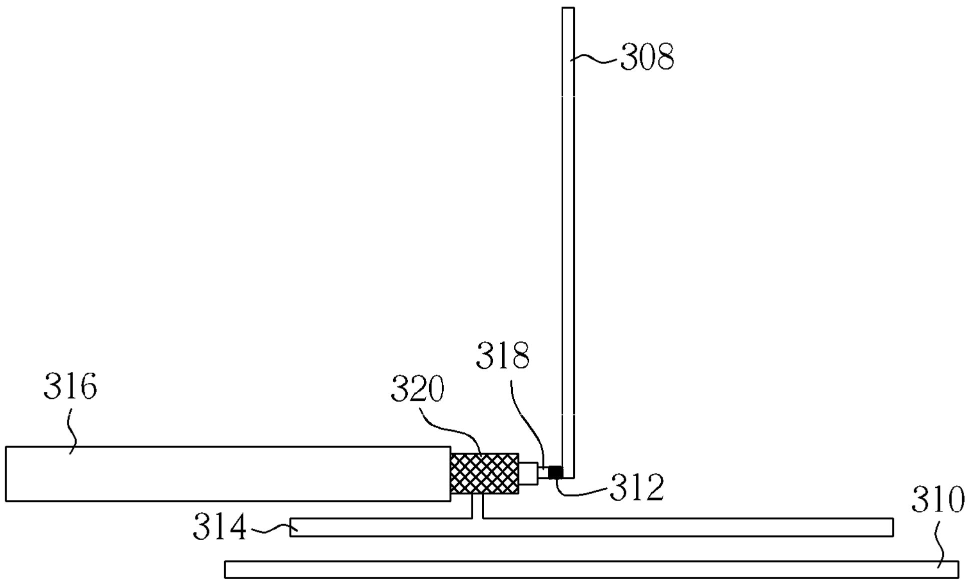
FIG. 10(*a*) is another schematic diagram of the feeding apparatus shown in FIG. 3 according to an embodiment of the invention.
Figure 10B:
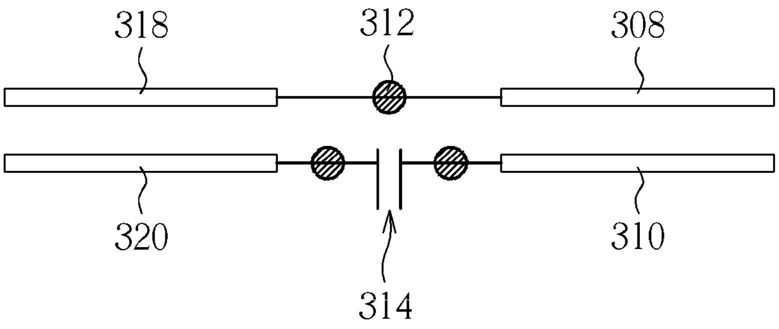

Besides, the feeding apparatus 304 can feed the analog broadcast signal S to the monopole antenna 302 by using electromagnetic coupling. Please refer to FIG. 8(*a*) and FIG. 8(*b*). FIG. 8(*a*) is another schematic diagram of the feeding apparatus 304 shown in FIG. 3 according to an embodiment of the invention. FIG. 8(*b*) is a schematic diagram of an equivalent transmission line when using the conduction method shown in FIG. 8(*a*) according to an embodiment of the invention. Generally speaking, from the standpoint of a microstrip line, impedance value Z of the microstrip line decreases with increasing value of capacitance C and frequency (Z=1/jwC). As the value of a coupling capacitor or operating frequency increases to a certain extent, the low impedance value Z can be considered a short circuit. Thus, as shown in FIG. 8(*a*), the first feeding unit 312 is capable of transmitting the analog broadcast signal S to the radiating unit 308 by using electromagnetic coupling. As a result, the first feeding unit 312 can utilize an insulted metal tube penetrated by the metal line of the radiating unit 308 to generate an electromagnetic coupling effect for feeding the analog broadcast signal S. The second feeding unit 314 can utilize an insulted metal plate to approach the grounding metal of the grounding unit 310. In addition, please further refer to FIG. 9(*a*) to FIG. 10(*b*). In FIG. 9(*a*), the signal transmission portion utilizes the electromagnetic coupling method shown in FIG. 8(*a*); the grounding portion utilizes the metal connecting method shown in FIG. 4(*a*). In FIG. 10(*a*), the signal transmission portion utilizes the metal connecting method shown in FIG. 4(*a*); and the grounding portion utilizes the electromagnetic coupling method shown in FIG. 8(*a*). Briefly, due to the feeding apparatus 304 having excellent feeding characteristics, the invention can transmit the received analog broadcast signal S to the analog broadcast player system 30 completely in order to play content of the digital satellite broadcast program.

Please note that the analog broadcast player system 30 is an exemplary embodiment of the invention, and those skilled in the art can make alternations and modifications accordingly. For example, in the embodiment, the analog broadcast player system 30 is a vehicle FM player device, but this is not a limitation. Any other multimedia system is suitable, such as a household multimedia system. Preferably, the analog broadcast player system 30 can be a head unit. In addition, the analog broadcast signal S can be any meaningful signal having a corresponding player device for playing. Any free or unused frequency band between 88 MHz and 108 MHz can be utilized for transmitting the analog broadcast signal S, but this is not a limitation. Moreover, in the coaxial cable 316, the inner conductor 318 is utilized for transmitting signals; the conducting mesh 320 is utilized for grounding. On the other hand, the above-mentioned wavelength is relative to operating frequency of the analog broadcast player system 30.

In addition, please refer to FIG. 11. FIG. 11 is a measurement result of a feeding characteristic under various frequencies according to an embodiment of the invention. A vector network analyzer is utilized for measuring a feeding characteristic of the feeding apparatus 304. The feeding apparatus 304 is placed at port 1 and the monopole antenna 302 is placed at port 2. Short cables are utilized for connecting between apparatuses and ports, so that the transmission loss of the coaxial cable 316 is neglectable. As shown in FIG. 11, the s parameter 511 is approximately below −10 dB, indicating the energy is almost transmitted. The s parameter 512 is approximately below −2 dB, indicating very large energy coupling to the monopole antenna 302. The $|S11|^2$ parameter indicates reflection energy and the $|S12|^2$ parameter indicates coupling energy. Suppose the total energy is 1 under the principle of conservation of energy. Then, the energy radiated to space is $(1-|S11|^2-|S12|^2)$. Therefore, as the ratio of coupling energy to energy radiated to space increases, the electrical characteristic becomes more excellent. In the embodiment, the ratio is between 1 and 5 dB, an excellent feeding characteristic.

In summary, in the prior art, as the analog broadcast signal is transmitted into the analog broadcast player system by radiation, it may cause unstable transmission due to limitations of the environment. Otherwise, the user needs to take the vehicle housing or interior apart and change the original wiring arrangement while connecting additional signal wires. Comparatively, through the feeding apparatus having excellent grounding characteristics, the invention can transmit the received analog broadcast signal to the analog broadcast player system completely, and the user is capable of playing content of the digital satellite broadcast program by sharing the analog broadcast player system without taking a vehicle housing or interior apart and considering the limitation of the FCC regulation, improving usage convenience, increasing feed energy, increasing ratio of coupling energy to energy radiated to space, and enhancing electrical characteristics.

Those skilled in the art will readily observe that numerous modifications and alterations of the device and method may be made while retaining the teachings of the invention.

What is claimed is:

1. A feeding apparatus for a monopole antenna having a radiating unit and a grounding unit, for transmitting a multimedia signal to a multimedia player device coupled to the radiating unit, the feeding apparatus comprising:

a first feeding unit coupled to an inner conductor of a coaxial cable for feeding the multimedia signal transmitted by the coaxial cable to the radiating unit; and a second feeding unit coupled to a conducting mesh of the coaxial cable for connecting to the grounding unit.

2. The feeding apparatus of claim 1, wherein the monopole antenna is a frequency modulation (FM) antenna, and the multimedia player device is a vehicle FM player device.

3. The feeding apparatus of claim 1, wherein the multimedia signal is an analog broadcast signal in an available FM frequency band and the analog broadcast signal is transformed from a digital satellite broadcast signal received by a digital satellite broadcast transformation device.

4. The feeding apparatus of claim 1, wherein the first feeding unit makes metal contact with the radiating unit in order to feed the multimedia signal to the radiating unit.

5. The feeding apparatus of claim 4, wherein the first feeding unit and the radiating unit are made of metal material.

6. The feeding apparatus of claim 1, wherein the second feeding unit makes metal contact with the grounding unit.

7. The feeding apparatus of claim 6, wherein the second feeding unit and the grounding unit are made of metal material.

8. The feeding apparatus of claim 1, wherein the first feeding unit and the radiating unit are ¼ wavelength open circuit transmission lines respectively.

9. The feeding apparatus of claim 1, wherein the second feeding unit and the grounding unit are ¼ wavelength open circuit transmission lines respectively.

10. The feeding apparatus of claim 1, wherein the first feeding unit feeds the multimedia signal to the radiating unit by using electromagnetic coupling.

11. The feeding apparatus of claim 1, wherein the second feeding unit is electromagnetically coupled to the grounding unit.

* * * * *